United States Patent [19]

Kleinschmidt et al.

[11] 4,382,377
[45] May 10, 1983

[54] PRESSURE SENSOR FOR AN INTERNAL COMBUSTION ENGINE

[75] Inventors: Peter Kleinschmidt; Valentin Magori, both of Munich, Fed. Rep. of Germany

[73] Assignee: Siemens Aktiengesellschaft, Berlin & Munich, Fed. Rep. of Germany

[21] Appl. No.: 261,283

[22] Filed: May 5, 1981

[30] Foreign Application Priority Data

May 16, 1980 [DE] Fed. Rep. of Germany ....... 3018856
Jun. 6, 1980 [DE] Fed. Rep. of Germany ....... 3021452

[51] Int. Cl.³ .............................................. G01L 23/22
[52] U.S. Cl. .......................................... 73/35; 73/706
[58] Field of Search ................... 73/35, 706; 310/338

[56] References Cited

U.S. PATENT DOCUMENTS

| | | | |
|---|---|---|---|
| 2,216,966 | 10/1940 | Swift | 310/338 |
| 3,247,705 | 4/1966 | Wostl | 73/35 |
| 3,673,443 | 6/1972 | Siegel | 310/338 |
| 3,785,209 | 1/1974 | Schijf | 73/706 |
| 4,193,647 | 3/1980 | Guess et al. | 73/35 X |

Primary Examiner—James J. Gill
Attorney, Agent, or Firm—Hill, Van Santen, Steadman, Chiara & Simpson

[57] ABSTRACT

A pressure sensor for an internal combustion engine has a piezoceramic transducer in an operating connection, by way of a plunger, with a membrane, the sensor being secured in a cylinder head of an internal combustion engine with the membrane located within a cylinder. The pressure sensor serves for detecting knock and ping.

19 Claims, 3 Drawing Figures

PRESSURE SENSOR FOR AN INTERNAL COMBUSTION ENGINE

BACKGROUND OF THE INVENTION

1. Field of the Invention

The present invention relates to a pressure sensor, and more particularly to a pressure sensor for use as a knock sensor for an internal combustion engine and which operates on the piezoelectric principle.

2. Description of the Prior Art

In the prior art, pressure sensors used as knock sensors in internal combustion engines are known which are attached in such a manner to the internal combustion engine that they indicate the momentarily-prevailing pressure within a cylinder. For the sake of complete completeness, such knock sensors are attached to the exterior wall of the engine block.

In FIG. 1, a crystal pressure transducer, having short-time temperature compensation, is illustrated, such as the type 12 QP 505 cl. This pressure transducer is to be screwed into the engine block with the threads 1 so that a plate 2 is positioned within a cylinder and is exposed to the prevailing pressure relationships within the cylinder. Short feed conduits for coolant are provided, as at 3 and 4. Such pressure transducers are so expensive that the use thereof is only considered in connection with diagnostic equipment.

SUMMARY OF THE INVENTION

It is the object of the present invention to provide a pressure sensor for internal combustion engines having a structure which is so technically simple to realize that the pressure sensor may be considered for use as a continuously-installed structural component of the engine, in particular in connection with a computer-controlled method of operation of the engine.

The above object is achieved, according to the present invention, in a pressure sensor which operates on the piezoelectric principle in which the sensor has a body of piezoceramic material as a sensor transducer, a rigid rod-shaped transmission connection and a membrane, in which these elements are arranged in a housing which is insertable into the engine block. From the membrane, located within a cylinder, by way of the transmission connection, compressive forces which occur are transmitted to the transducer, the transducer being structured as a bending transducer which comprises a metal plate on a piezoceramic body which are compounded into a bimorphous body. The membrane, the transmission connection and converter are mounted, pre-stressed, in the housing.

The present invention is based upon the idea that, instead of a quartz crystal as a piezoelectric transducer element, a piezoceramic may be used which may be exposed to no higher temperature than, for example, 150° C. At a higher temperature, the piezoceramic would irreversibly loose this effect.

In order to eliminate the excess temperature problem mentioned above for a piezoceramic, the piezoceramic transducer, according to the present invention, is mounted in such a manner that it has sufficient protection against the high heat within the cylinder, but, however, is able to accurately reproduce the pressure conditions prevailing within the cylinder. Correspondingly, a structural member is provided according to the principle of a sliding plunger, with which the movement of a membrane, acted upon by the pressure distribution within the cylinder, is transmitted to a piezoceramic bending element which is designed accommodated to this special application and for the special physical conditions of such application. The piezoceramic element is a bilaminar bending element consisting of a metal plate and a disc of piezoceramic material fastened thereupon with a connection electrode as a backplate electrode to the metal plate. This transducer of a metal plate and a ceramic disc is, in a simple manner, installed adapted to the pressure sensor of the invention.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
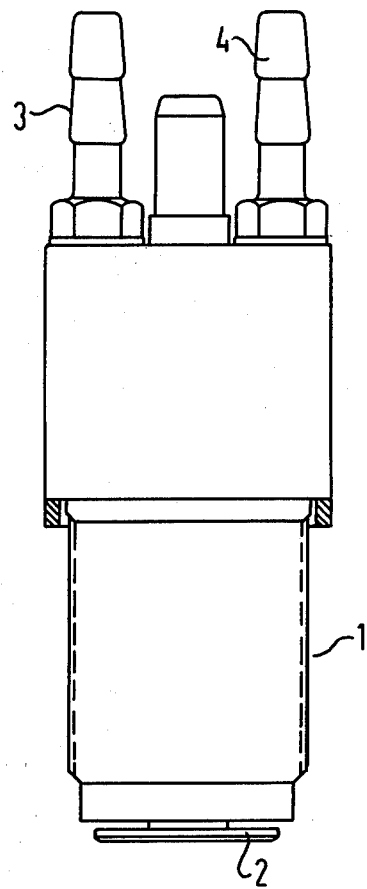
FIG. 1 is an elevational view of a prior art pressure sensor.

FIG. 1 has been briefly discussed above and should not be necessary to deal with the same in greater detail herein.

Figure 2:
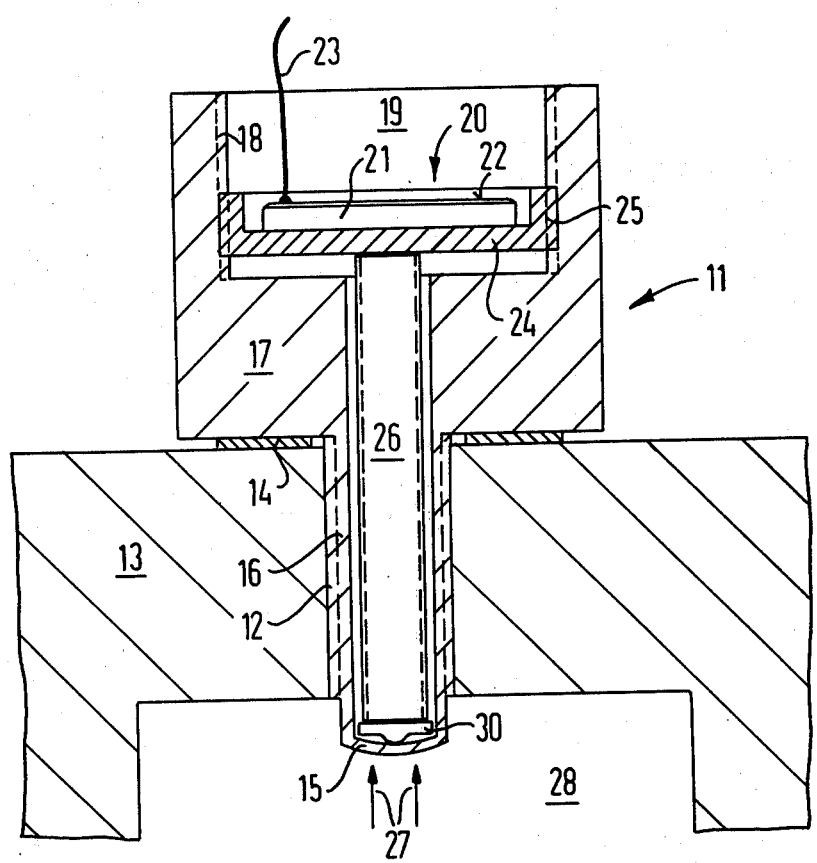
FIG. 2 is a longitudinal sectional view of a pressure sensor constructed in accordance with the present invention and mounted on an internal combustion engine.

Referring to FIG. 2, a pressure sensor constructed in accordance with the present invention is illustrated at 11 as comprising a housing 17 having an extended threaded portion 12 for threadingly engaging complementary threads (not referenced) in a cylinder head 13 of an internal combustion engine. With the thread 12, the pressure sensor 11 is screwed gas-tight into the cylinder head 13, such connection being assisted with a relatively hard sealing ring 14. The sealing ring 14 may be a copper ring. By way of the ring 14, the transducer housing is braced firmly against the exterior wall of the cylinder head 13. The thread 12 is part of an elongate tubular section 16 which is closed at the front end 15, the tubular section 16 being a continuation of the pressure sensor housing 17. A further thread 18 is provided at the rear side in a recess 19 of the pressure sensor housing 17. The thread 18 serves the purpose of fastening the sensor transducer 20 within the recess 19 of the housing 17 in a technically simple manner.

The sensor transducer 20 in this embodiment of the invention comprises a plate 21 which is a ceramic body of permanently-polarizable piezoelectric ceramic material, as for example, lead-zirconate-titanate. This material has a Curie temperature of, for example, over 300° C. and can thus easily tolerate operating temperatures up to 150° C. It also has a high piezoelectric effect, that is, a high coupling coefficient. On its one surface, the plate 21 has an electrode coating 22, which is customary for ceramic, on which a connection line 23 is secured. On the side of the plate 21 lying opposite the electrode layer 22, the plate 21 is solidly connected with an essentially disc-shaped metal plate 24, as illustrated on the drawing. The ceramic plate 21 and the metal plate 24 together form a bimorphous or bilaminar piezoelectric bending sensor transducer 20.

The sensor transducer 20 is preferably installed in the housing 17 on its outer edge and specifically and preferably with the metal plate. Advantageously, the insertion as illustrated on the drawing is by way of a thread 25 on the outer edge of the plate 24 which threadingly engages the thread 18 within the recess 19 of the housing 17. The total transducer can thus be easily screwed into the housing 17. Therefore, the metal plate 24 can also be cooled very well by way of the thread 25, so that the heat proceeding from the front 15 of the pressure transducer to the metal plate 24 can be diverted to a great extent before reaching the ceramic plate 21.

The threading-in of the transducer 20 with the help of the threads 18, 25 makes it possible to rigidly fix the plunger 26 which is provided as the transmission connection between the transducer 20 and the front end 15 of the tubular section 16, so that the front end 15 of the tubular section 16, which operates as a membrane, the transducer 20 and the plunger 26 can be mechanically pre-stressed. This pre-stressing is selected to be so high that in the case of all thermal expansion of a portion of the total sensor, the transducer 20 always remains pre-stressed with respect to the front end 15. An additional centering disc 30 may also be provided.

The front end 15 of the pressure sensor 11 is designed and dimensioned such that it is effective as a pressure-transmitting membrane. Within the cylinder 28, the pressure prevailing, indicated by the arrows 27, can be transmitted to the sensor transducer 20 by way of the front end 15, operating as a bending pressure membrane, by way of the plunger 26 operating as a transmission connection. The pressure 27 transmitted by way of the membrane 15 and the plunger 26 to the transducer 20 is converted in the piezoceramic plate 21 of the transducer 20, which bends under this force, into an electrical signal to be received between the connection line 23 and the housing 17. This electrical signal is then evaluated in a desired manner in each case electronically (as in the case of the known pressure transducer described with respect to FIG. 1).

Figure 3:
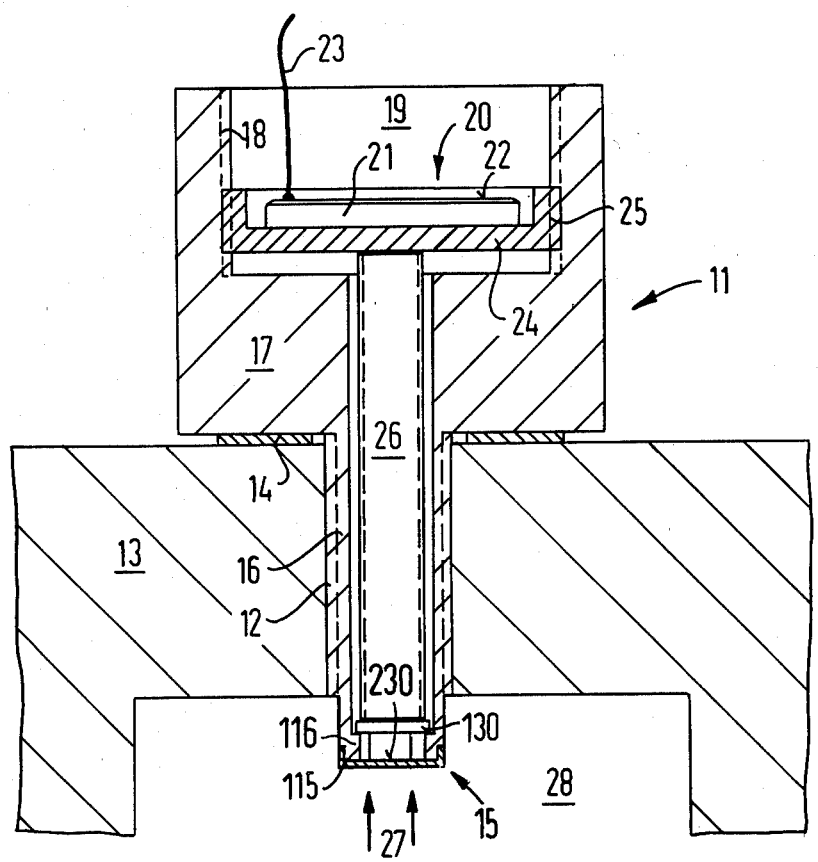
FIG. 3 is a longitudinal sectional view of another embodiment of a pressure sensor constructed in accordance with the present invention, and illustrated as mounted on an internal combustion engine.

FIG. 3 illustrates another embodiment of the invention in which the pressure sensor differs only from the pressure sensor of FIG. 2 at the forward end. In the pressure sensor of FIG. 3, a membrane 115 is provided, for example titanium, which closes, gas-tight, the end of the extended section 16 of the housing 17, by way of the membrane 115, the pressure 27 can be transmitted to a pressure-receiving surface 230 of a centering disc 130 and by way of the plunger 26 to the sensor transducer 20. As illustrated, the front end of the tubular section 16 is designed with a shoulder 116, which receives the end of the plunger 26, if the same is used, the centering disc 130. The transducer 20 and the plunger 26 can thus be held against the shoulder 116, again pre-stressed, without, however, the pre-stressing continuously burdening the membrane 115.

The improved embodiment of the pressure transducer of FIG. 3 guarantees a longer service life of the thermally, highly-loaded membrane 115, which here no longer additionally is under a continuous mechanical pre-stress.

For example, with a pressure transducer of the types illustrated in FIGS. 2 and 3 and constructed in accordance with the invention, it can be determined momentarily whether the progress of the engine is in an operating state known as "knock" or "ping" which has a very diminishing effect upon the service life of the engine. The appearance of such a knock or ping can be eliminated by a corresponding shift to retard ignition. Otherwise, one permits the engine to operate with a suitable, relatively-strong early ignition for the purpose of fuel conservation.

The housing 17 (as not illustrated in detail) is designed, for example, as a hexagon in order to adapt threaded connection into the cylinder head 13 in a gas-tight manner with a corresponding wrench.

In the operation as a pressure sensor, the transducer 20 delivers the signals corresponding to the temporal pressure distribution 27, which signals have a specific characteristic form in the case of the presence of knock. The frequency of the knock lies between 5 and 10 kHz, in particular at 7 kHz. The total pressure sensor (FIGS. 2 and 3) is designed and dimensioned such that its natural frequency, in comparison to the frequencies occurring as pressure signals, is comparatively high, that is, significantly above 10 kHz. For a resonant frequency of 10 kHz, the maximum length $l_o$ of the plunger 26 must be smaller than a fourth of the transducer length with which an oscillation at 10 kHz frequency can travel thereon. For a speed of sound in the plunger of 5000 m/s and an upper limiting frequency of 10 kHz, there results a wave length of $\lambda = 50$ cm. The maximum plunger length is thus limited to $l_o = 12.5$ cm. By dimensioning the diameter and thickness of the ceramic plate 21 and the metal plate 24, further, the bending resonance of this composite structure is to be set such that it lies above, and by an order of magnitude in the vicinity of, the upper limiting frequency (10 kHz). If it is selected to be significantly higher (too thick bender or too small diameter), the sensitivity of the pressure sensor decreases. If it lies lower, undesired resonance phenomena occurs.

The bending resonance can be estimated with sufficient accuracy according to the relationship $$f_{res} = 5000 \text{ mm} \cdot d/D^2 \text{ kHz}$$

where d is the total thickness of the ceramic plate 21 and the metal plate 24, in millimeters, and D is the diameter of the metal plate 24 measured up to the edge 25, again in millimeters.

For a diameter D of 20 mm and a thickness d of 2 mm, there results a resonant frequency of $$f_{res} = 25 \text{ kHz}.$$

The elastic flexibility of the membrane 15, 115 with respect to the plunger forces should lie in the same order of magnitude as the elastic flexibility of the composite ceramic plate 21 and metal plate 24. The size of the bending composite structure (diameter D) is limited by its inert mass. The maximum allowable mass is limited by the elastic flexibility of the plunger; short plungers permit larger masses. If the plunger mass is designated as m, then the mass of the bending composite structure should not exceed a value M. M is calculated according to the relationship $$M = (\tfrac{1}{2})(l_o/l)^2 \cdot m,$$

where l is the actual length of the plunger, $l_o$ is the maximum length of the plunger (for example 12.5 cm at a 10 kHz frequency limit) and m is the mass of the plunger.

The absolute values for the mass result with the above equations from the bore hole diameters in the cylinder head which are present for the insertion of the pressure sensor.

It can be advantageous to fill the interspace between the plunger 26 and the metal disc 24, on the one hand, and the housing 17 and the tubular section 16, on the other hand, with a lubricant which, in addition has a good heat-conducting characteristic or such, which also has certain oscillation-attenuating characteristics. The heat is thereby diverted from the plunger 26 to the tubular section 16 screwed into the cooled cylinder head 13.

Problems of known respective pressure sensors produce the circumstances which lead to a signal emission which is not at all based upon the pressure or pressure distribution to be measured. By means of rapidly-changing temperature actions, in particular of the membrane end 15, thermal expansion and/or bending movements of the same are brought about which can lead to interference signals. The dimensioning of the elements 15, 16 and 26 is thus selected such that no greatly varied thermal expansions of the same are present. The selected prestressing of the transducer against the membrane 15, 115, or respectively, the disc 30, 130 also avoids these problems.

For additional protection of the ceramic plate 21 of the transducer 20 against high temperatures within the cylinder 28, it is provided that the plunger 26 be designed as a element having a low heat-conducting characteristic, in particular to manufacture this element out of V2A steel and/or to use a hollow tube as the plunger.

Exemplary embodiments of the invention, as illustrated in FIGS. 2 and 3, for example, have a 20-30 mm long plunger 26 of V2A steel. The ceramic plate 21 has approximately 10 mm $\phi$ and is 1 mm thick. The metal plate 24 is also 1 mm thick. The thread 12 can be a standard spark plug thread such as a M14. The associated cylinder head 13 has a further tapped bore corresponding to the spark plug receptacle for receiving the pressure sensor constructed in accordance with the present invention.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may be included within the scope of my contribution to the art.

I claim:

1. A pressure sensor for an internal combustion engine which has an engine wall with a bore therethrough, the wall partially defining an engine cylinder, comprising:
   a housing including an elongate, first housing section adapted to be received through the bore and sealed gas-tight to the wall, said section including a first end to be positioned within the cylinder and a membrane at said first end continuous with said housing to be subjected to the pressures within the cylinder, and a second housing section including means defining a threaded recess;
   a pressure/electrical transducer threadedly mounted in the housing recess including output signal connections and responsive to forces applied thereto to produce corresponding output signals; and
   a force connection element mechanically coupled between said membrane and said transducer.

2. The pressure sensor of claim 1, wherein:
   said transducer comprises a piezoceramic plate; and
   a metal plate carrying said piezoceramic plate and connected to said force connection element.

3. The pressure sensor of claim 2, wherein:
   said metal plate includes edge threads for engaging said threads of said threaded recess.

4. The pressure sensor of claim 1, wherein:
   said element is a rod-shaped plunger.

5. The pressure sensor of claim 4, wherein:
   said plunger comprises V2A steel.

6. The pressure sensor of claim 1, wherein:
   said element is a hollow tube.

7. The pressure sensor of claim 1, wherein:
   said membrane is convex with respect to the cylinder and is designed not to flex to concave portions.

8. A pressure sensor for an internal combustion engine which has an engine wall with a bore therethrough, the wall partially defining an engine cylinder, comprising:
   a housing including an elongate, first housing section adapted to be received through the bore and sealed gas-tight to the wall, said section including a first end including a first shoulder, to be positioned within the cylinder and a membrane at said first end mounted on said first shoulder to be subjected to the pressures within the cylinder, and a second housing section including means defining a threaded recess;
   a pressure/electrical transducer threadedly mounted in the housing recess including output signal connections and responsive to forces applied thereto to produce corresponding output signals; and
   a force connection element mechanically coupled between said membrane and said transducer,
said first housing section including an elongate bore therethrough receiving said force connection element therethrough, and an internal second shoulder spaced from said membrane, said force connection element comprising a ring bearing against said second shoulder to relieve said transducer of stress in a state of rest.

9. The pressure sensor of claim 8, wherein:
   said element is a rod-shaped plunger.

10. The pressure sensor of claim 9, wherein:
    said plunger comprises V2A steel.

11. The pressure sensor of claim 8, wherein:
    said element is a hollow tube.

12. The pressure sensor of claim 8, wherein:
    said membrane is a thin sheet of titanium.

13. The pressure sensor of claim 8, wherein:
    said membrane is a thin sheet of tungsten.

14. The pressure sensor of claim 8, wherein:
    said transducer comprises a piezoceramic plate; and
    a metal plate carrying said piezoceramic plate and connected to said force connection element.

15. The pressure sensor of claim 8, wherein:
    said membrane comprises:
    a thin sheet of titanium.

16. The pressure sensor of claim 8, wherein:
    said membrane comprises:
    a thin sheet of tantalum.

17. The pressure sensor of claim 8, wherein:
    said membrane comprises:
    a thin sheet of tungsten.

18. A pressure sensor for an internal combustion engine which has an engine wall having a bore therethrough, which wall partially defines an engine cylinder, comprising:
- a housing including a housing section adapted to be received through the bore and sealed gas-tight to the wall, said section including a first end to be positioned within the cylinder and a membrane at said first end to be subjected to pressures within the cylinder;
- said housing wall including a second end comprising a recess which includes internal threads;
- a pressure/electrical transducer mounted in said recess of said housing, said transducer including output signal connections and responsive to forces to produce a corresponding signal, said transducer comprising a piezoceramic plate, and a metal plate covering said piezoceramic plate and facing the internal combustion engine, said metal plate including edge threads for engaging said internal threads of said recess; and
- an element mechanically coupled between said membrane and said transducer for transmitting forces from the cylinder to said transducer.

19. A pressure sensor for an internal combustion engine which has an engine wall with a bore therethrough, the wall partially defining an engine cylinder, comprising:
- a housing including an elongate first housing section adapted to be received through the bore and sealed gas-tight to the wall, said section including a first end including a shoulder, to be positioned within the cylinder and a membrane at said first end mounted on said shoulder to be subjected to the pressures within the cylinder, and a second housing section including means defining a threaded recess;
- a pressure/electrical transducer threadedly mounted in the housing recess including output signal connections and responsive to forces applied thereto to produce corresponding output signals, said transducer comprising a piezoceramic plate and a metal plate carrying said piezoceramic plate and including edge threads for threadedly engaging the threads of said threaded recess; and
- a force connection element mechanically coupled between said membrane and said metal plate.

* * * * *